No. 878,010.
PATENTED FEB. 4, 1908.
W. E. MERRELL.
CUTLERY WASHING MACHINE.
APPLICATION FILED MAY 3, 1907.
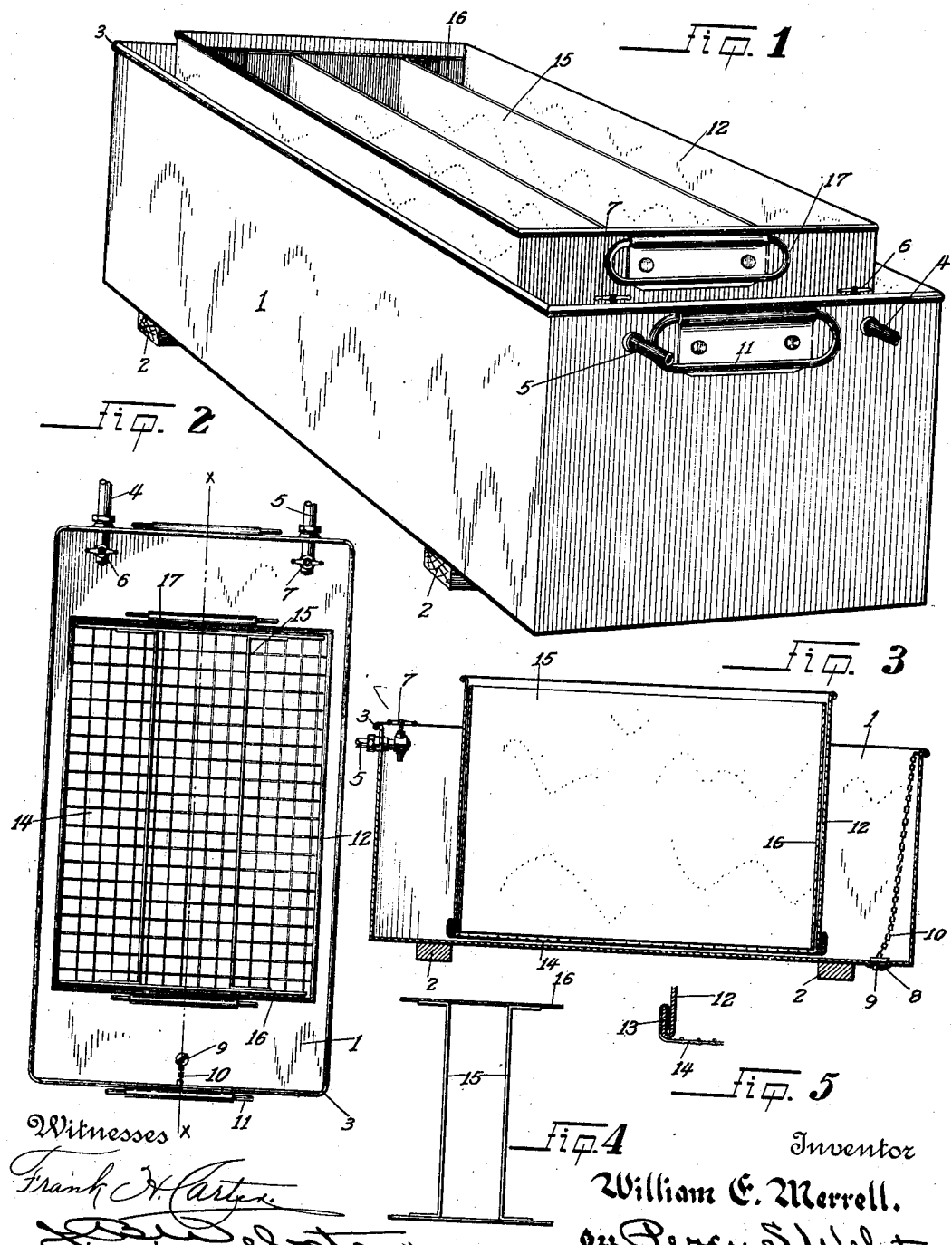
Witnesses
Frank H. Carter
Inventor
William E. Merrell.
By Percy S. Webster
Attorney

UNITED STATES PATENT OFFICE.

WILLIAM E. MERRELL, OF STOCKTON, CALIFORNIA.

CUTLERY-WASHING MACHINE.

No. 878,010.

Specification of Letters Patent.

Patented Feb. 4, 1908.

Application filed May 3, 1907. Serial No. 371,739.

*To all whom it may concern:*

Be it known that I, WILLIAM E. MERRELL, a citizen of the United States, residing at Stockton, in the county of San Joaquin and State of California, have invented certain new and useful Improvements in Cutlery-Washing Machines; and I do declare the following to be a full, clear, and exact description of the same, such as will enable others skilled in the art to which it appertains to make and use the same, reference being had to the accompanying drawings, and to the characters of reference marked thereon, which form a part of this specification.
This invention relates to improvements in dish washer machines and particularly to knife, fork and spoon washers and drainers, the object of the invention being to clean a large quantity of said articles at one time in a thorough and effective manner. This object I accomplish by means of a water receptacle having certain faucet connections, and by an inner receptacle having a foraminous bottom, said inner receptacle having separate compartments for the various articles to be washed. This inner receptacle is adapted to be oscillated; also by such other and further construction as will appear by a perusal of the following specification and claim.

In the drawings similar characters of reference indicate corresponding parts in the several views.

Figure 1 is a perspective view of the complete device. Fig. 2 is a top plan view thereof. Fig. 3 is a sectional view taken on a line $x$ $x$ of Fig. 2. Fig. 4 is a top plan view of dividing partitions. Fig. 5 is a fragmentary view of a foraminous bottom connection.
Referring more particularly to the reference numerals on the drawings 1 designates an outer water receptacle provided with bottom supporting cleats 2. Said receptacle is formed of zinc or other suitable material with its upper edges turned over a stiff wire 3 which extends continuously around the upper contour of said receptacle. Said receptacle is furnished at one end near the top thereof with hose connections 4 and 5 having faucet connections 6 and 7 within said receptacle. In the bottom of said receptacle at one end thereof is a drain orifice 8 having a plug 9 held to said receptacle by a chain 10. Said receptacle is provided with handles 11.

Disposed within said receptacle 1 is an inner receptacle 12 having its top edge formed in a manner similar to that on the receptacle 1. The lower part of said receptacle 12 has an upturned edge 13 all around. Bent into and upturned edge 13 all around and se-engaging with said upturned edge and secured therein is wire mesh or other foraminous material 14, forming the bottom of the receptacle 12. Arranged in said receptacle 12 are partitions 15 spaced apart and dividing said receptacle 12 into three parts. Said members 15 are secured to removable plates 16. Said receptacle 12 is provided with handles 17.

In practice the knives, forks and spoons are separate and each placed in one of the compartments formed by the partitions 15. Suitable quantities of hot and cold water are then turned into the receptacle 1 through the faucets 6 and 7. The operator then grasps the handles 17 and places the receptacle 12 into the water, the water entering the said receptacle 12 through the foraminous bottom 14. The operator then oscillates the receptacle 12 rapidly through said water, thus cleansing the knives, forks and spoons thoroughly. When they are sufficiently cleansed the receptacle 12 is removed from the water, the water and dirt draining through the bottom 14. Hot water may then be run onto the articles in said receptacle 12, thus thoroughly rinsing them and draining off through the bottom 14.

The feature of the upturned edge 13 holding the bottom 14 is of much importance as it forms a strong and durable fastening for such bottom, which permits of more material being handled at one time. When desired for the purpose of cleansing or otherwise, the partitions 15 may be removed by reason of their being secured to the removable plates 16. When it is desired to drain the water from the receptacle 1 the plug 9 is removed, thus permitting the water to flow through the orifice 8. Thus it will be seen I have produced a knife, fork and spoon washer which substantially fulfils the objects of the invention as set forth herein.

While in this specification I have set forth in detail the present and preferred construction of my device, still in practice many small deviations from such detail may be resorted to at will without departing from the spirit of the invention.

Having thus described my invention what I claim as new and useful and desire to secure by Letters Patent is:—

In a dish washing machine, a receptacle embodying side and end walls and having a foraminous bottom, removable plates mounted in said receptacle, and longitudinally-extending members secured to said plates and forming said receptacle with a plurality of compartments.

In testimony whereof I affix my signature in presence of two witnesses.

WILLIAM E. MERRELL.

Witnesses:
PERCY S. WEBSTER,
STEPHEN BLEWETT.